(12) United States Patent
Ngai

(10) Patent No.: US 8,886,161 B2
(45) Date of Patent: Nov. 11, 2014

(54) METHODS AND APPARATUS TO DISCOVER SPECTRUM USAGE OF MOBILE CARRIERS

(71) Applicant: Dominic H. Ngai, Plano, TX (US)

(72) Inventor: Dominic H. Ngai, Plano, TX (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 0 days.

(21) Appl. No.: 13/646,308

(22) Filed: Oct. 5, 2012

(65) Prior Publication Data

US 2014/0099914 A1    Apr. 10, 2014

(51) Int. Cl.
G06F 15/16 (2006.01)

(52) U.S. Cl.
USPC ........................................ 455/405; 455/562.1

(58) Field of Classification Search
USPC ...................... 455/405, 450, 451, 561, 562.1; 370/210, 329, 432
See application file for complete search history.

(56) References Cited

U.S. PATENT DOCUMENTS

| | | |
|---|---|---|
| 5,884,175 A | 3/1999 | Schiefer et al. |
| 5,982,305 A | 11/1999 | Taylor |
| 6,052,406 A | 4/2000 | Epstein et al. |
| 6,782,264 B2 | 8/2004 | Anderson |
| 6,947,703 B2 | 9/2005 | Ceresoli et al. |
| 7,089,003 B2 | 8/2006 | Fingerhut et al. |
| 7,167,713 B2 | 1/2007 | Anderson |
| 7,302,243 B2 | 11/2007 | Tarbouriech |
| 7,623,823 B2 | 11/2009 | Zito et al. |
| 7,724,725 B2 | 5/2010 | Choksi |
| 2007/0174876 A1 | 7/2007 | Maggio et al. |
| 2008/0249976 A1 | 10/2008 | Ojanpera |
| 2008/0293393 A1 | 11/2008 | Hartmaier |
| 2010/0082688 A1 | 4/2010 | Davis et al. |
| 2010/0246544 A1 | 9/2010 | Brisebois et al. |
| 2010/0257052 A1 | 10/2010 | Zito et al. |
| 2012/0108266 A1 | 5/2012 | Clark et al. |
| 2013/0189977 A1 | 7/2013 | Brisebois et al. |
| 2013/0286990 A1* | 10/2013 | Park et al. ..................... 370/329 |

* cited by examiner

*Primary Examiner* — Sam Bhattacharya
(74) *Attorney, Agent, or Firm* — Hanley, Flight and Zimmerman, LLC

(57) ABSTRACT

Methods and apparatus are disclosed for discovering spectrum usage of mobile carriers. An example method includes extracting channel information from a plurality of messages transmitted to mobile devices over a wireless communications radio spectrum, identifying a mobile carrier based on the channel information, associating the channel information with a network parameter of the mobile carrier, and determining a channel usage characteristic associated with mobile carrier based on the channel information and the network parameter.

36 Claims, 11 Drawing Sheets

700

| Number | Hopping List |
|---|---|
| 1 | 703, 706, 734 |
| 2 | 703, 709, 712 |
| 3 | 703, 724, 730 |
| 4 | 704, 708, 713 |
| 5 | 705, 718, 733 |
| 6 | 707, 728, 730 |
| 7 | 708, 715, 722 |
| 8 | 710, 716, 734 |
| 9 | 711, 718, 725 |
| 10 | 711, 719, 734 |
| 11 | 714, 728, 732 |
| 12 | 722, 725, 728 |
| 13 | 724, 728, 730 |
| 14 | 703, 727, 729, 735 |
| 15 | 704, 715, 723, 729 |
| 16 | 705, 714, 719, 734 |
| 17 | 706, 717, 731, 735 |
| 18 | 710, 714, 717, 732 |
| 19 | 711, 724, 727, 733 |
| 20 | 717, 724, 727, 731 |
| 21 | 687, 708, 723, 730, 735 |
| 22 | 687, 709, 716, 730, 735 |
| 23 | 687, 709, 717, 719, 722 |
| 24 | 703, 724, 731, 733, 735 |
| 25 | 704, 706, 718, 721, 729 |
| 26 | 704, 710, 721, 723, 725 |
| 27 | 705, 717, 727, 732, 735 |
| 28 | 706, 711, 716, 723, 729 |
| 29 | 707, 710, 719, 727, 730 |
| 30 | 708, 713, 727, 733, 735 |
| 31 | 711, 722, 724, 726, 728 |
| 32 | 713, 717, 722, 724, 727 |
| 33 | 687, 703, 709, 715, 726, 732 |
| 34 | 705, 712, 714, 719, 726, 732 |
| 35 | 705, 714, 716, 718, 720, 731 |
| 36 | 707, 711, 724, 726, 728, 730 |
| 37 | 711, 713, 717, 722, 725, 727 |
| 38 | 687, 708, 710, 721, 724, 731, 735 |
| 39 | 706, 712, 715, 717, 719, 727, 735 |
| 40 | 707, 711, 713, 716, 722, 727, 729 |
| 41 | 687, 703, 705, 708, 713, 716, 718, 727, 731, 733, 735 |
| 42 | 704, 706, 710, 712, 715, 717, 719, 721, 723, 725, 729 |

FIG. 7

METHODS AND APPARATUS TO DISCOVER SPECTRUM USAGE OF MOBILE CARRIERS

FIELD OF THE DISCLOSURE

This disclosure relates generally to mobile communication, and, more particularly, to discovering spectrum usage of mobile carriers.

BACKGROUND

The radio frequency spectrum is an expensive resource for mobile carriers. Effective allocation of channels to the portion of the spectrum allotted to a mobile carrier can be pivotal to the success of the mobile carrier. Furthermore, radio planning strategies can effectively determine the quality of service that is provided by a mobile carrier.

BRIEF DESCRIPTION OF THE DRAWINGS

FIG. 7 is an example frequency hopping list table that may be generated using the example apparatus of FIGS. 1 and/or 2.

DETAILED DESCRIPTION

Figure 1:
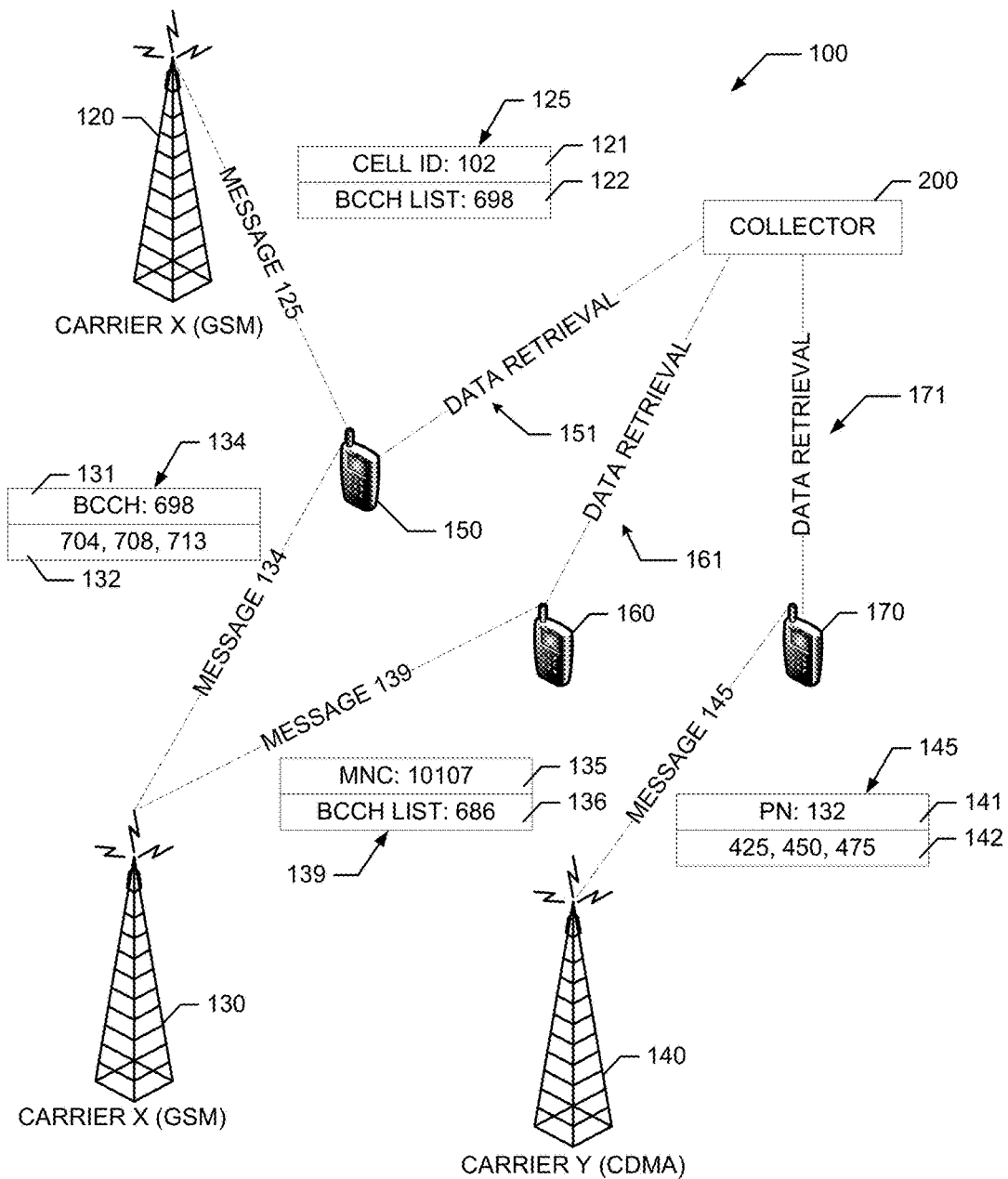
FIG. 1 illustrates an example collector to discover spectrum usage of mobile carriers in an example environment of use.

Methods, apparatus, and articles of manufacture to discover spectrum usage of mobile carriers are disclosed herein. In some examples, channel information in control messages transmitted between a mobile device and a base station of a mobile network is extracted and correlated to provide insight into channel and/or spectrum usage of the mobile network. Example methods disclosed herein for discovering spectrum usage of mobile carriers include determining corresponding mobile carriers based on channel information extracted from a plurality of messages transmitted to mobile devices over a wireless communications radio spectrum. Some example methods also include associating the channel information with network parameters of the plurality of mobile carriers. Some examples methods also include determining channel usage characteristics associated with the mobile carriers based on the associated channel information and/or network parameters.

In some example methods, the channel information includes one or more of random access channel (RACH) allocation information or broadcast channel (BCCH) allocation information in neighboring cells of a global system for mobile communications (GSM) network for messages received by mobile devices in an idle state. In some examples, the channel information includes frequency hopping channel allocation information in neighboring cells of a GSM network corresponding to messages received by a mobile device in a traffic state. In some examples methods, the network parameters for a GSM network include one or more of a cell identification, a broadcast control channel identifier, a mobile country code, a network code, or a location area code. In some examples, the channel usage characteristics for a global system for mobile communications network include a channel allocation ratio, a channel allocation ratio for traffic usage, a channel allocation ratio for shared control and traffic usage and/or a frequency hopping list.

In some examples, the channel information includes at least one of mobile carrier frequencies or channel numbers for use in a code division multiple access (CDMA) network corresponding to messages received by mobile devices in an idle state. In some examples, the channel information includes one or more of PN (Pseudo Noise) codes for a corresponding cell in which the message was received and/or handoff frequencies of neighboring cells in a CDMA network received by the mobile devices in a traffic state. In some examples the network parameters for a CDMA network include one or more of a total radio frequency spectrum for the mobile carrier or a channel allocation for each sector of a network cell of the mobile carrier. In some examples, the channel usage characteristics of a CDMA network include total radio frequency spectrum for the mobile carrier and/or a channel allocation for each sector of a network cell of the mobile carrier.

In some examples, associating the channel information with the network parameters includes storing the channel information with other channel information associated with previously transmitted messages using the same or similar network parameters.

Some example methods also include displaying the channel usage characteristics on a display of a device. In some examples, the display includes in a data table or chart and/or a geographic map representing the geographic location(s) of the usage characteristics. In some examples, the geographic locations of where the messages were transmitted and/or received is monitored and/or recorded for each of the messages. In some examples, the geographic locations at which the messages were transmitted and/or received are determined by one or more of the network parameters (e.g. the base station identification, area code, etc.) or a global positioning system (GPS).

FIG. 1 illustrates an example collector 200 constructed in accordance with the teachings of this disclosure for discovering spectrum usage of mobile carriers. The example collector 200 of FIG. 1 is shown in an example environment of use 100. The example environment 100 of FIG. 1 depicts several base stations 120, 130, 140, and several mobile devices 150, 160, 170. In the illustrated example, the base stations 120, 130 are access points of a network of a first mobile carrier X, and the base station 140 is an access point of a network of a second mobile carrier Y. In the illustrated example, the first mobile carrier X employs a GSM protocol and the second mobile carrier Y employs a CDMA protocol. Accordingly, in the illustrated example, a first mobile device 150 communicates with the GSM network of the first mobile carrier X via either or both of the base stations 120, 130. The second mobile device 160 communicates with the GSM network of the first mobile carrier X via the base station 130. The third mobile device 170 communicates with the CDMA network of the second mobile carrier Y via the base station 140. In the illustrated example, the collector 200 receives data via communication links 151, 161, 171 from the mobile devices 150, 160, 170. The example communication links 151, 161, 171 between the example mobile devices 150, 160, 170 and the example collector 200 may be wireless and/or wired (e.g., via a universal serial bus (USB) at a docking station, etc.).

The base stations 120, 130, 140 of the illustrated example embed network parameter(s) in network parameter fields 121, 131, 135, 141 and channel information in channel information field(s) 122, 132, 136, 142 of messages 125, 134, 139, 145 (e.g., Layer 3 messages), respectively. In the illustrated example of FIG. 1, the first base station 120 sends the message 125 to the first mobile device 150; the second base station 130 sends the message 134 to the first mobile device 150 and the message 139 to the second mobile device 160; and the third base station 140 sends the message 145 to the third mobile device 170.

In some examples, the network parameters for a GSM network include one or more of a cell identification (cell ID), a BCCH, a mobile network code (MNC), a mobile country code (MCC), or a location area code (LAC). In some examples, the network parameters for a CDMA network include one or more of a pseudo-noise (PN) offset, a system identification number (SID), or a network identification number (NID). In some examples, the channel information for a GSM network may include a BCCH allocation information (e.g., an allocation list) and/or a frequency hopping list. In some examples, the channel information for a CDMA network may include CDMA carrier frequencies.

In the illustrated example of FIG. 1, the message 125 includes a cell ID in the network parameter field 121, indicating the cell identification 102 of the first base station 120. The message 125 includes a BCCH list in the channel information field 122, indicating that a neighboring base station (e.g., the second base station 130) of the first base station 120 uses BCCH 698 for broadcasting control information. The example message 134 in FIG. 1 includes a BCCH in the network parameter field 131 identifying channel 698 as a BCCH for the second base station 130. The example message 134 includes a frequency hopping list in the channel information field 132 identifying three channels 704, 708, 713 for use in frequency hopping. The example message 139 in FIG. 1 includes a MNC in the network parameter field 135, indicating the mobile network code is 10107 for the second base station 130. The message 139 includes a BCCH list in the channel information field 136, indicating that a neighboring base station (e.g., the first base station 120) of the second base station 130 uses BCCH 686 for broadcasting control information. In the illustrated example of FIG. 1, the message 145 includes a PN-Offset in the network parameter field 141, identifying the sector 132 of the third base station 140 to which the message was transmitted, and carrier frequency numbers in the channel information field 142, indicating the carrier frequencies used in the sector 132.

The example collector 200 of FIG. 1 retrieves data from the first, second, and third mobile devices 150, 160, 170 via the communication links 151, 161, 171, respectively. In some examples, the first, second, and third mobile devices 150, 160, 170 forward the messages 125, 134, 139, 145 to the collector 200. In some examples, the collector 200 extracts the network parameter(s) from the network parameter fields 121, 131, 135, 141 and/or the channel information(s) from the channel information fields 122, 132, 136, 142 for processing as described herein.

In some examples, the first, second, and third mobile devices 150, 160, 170 extract the network parameter(s) from the network parameter fields 121, 131, 135, 141 and/or the channel information(s) from the channel information fields 122, 132, 136, 142. Accordingly, in such examples, the data retrieved by the collector 200 via communication links 151, 161, 171 includes the network parameter(s) from the network parameter fields 121, 131, 135, 141 and/or the channel information(s) from the channel information fields 122, 132, 136, 142.

In the illustrated example of FIG. 1, the messages 125, 134, 139, 145 are Layer 3 messages. However, any other type of message using any past, present, or future protocol(s) may additionally or alternatively be employed. The type of Layer 3 message transmitted from the base stations 120, 130, 140 and subsequently the type of network parameters and channel information included in the messages 125, 134, 139, 145 depends on whether the mobile devices 150, 160, 170 are in idle state(s) or traffic state(s) when communicating with the base stations 120, 130, 140. In an idle state, an example mobile device 150, 160, 170 will typically only be sending/receiving control data or status information to/from corresponding base stations 120, 130, 140, respectively. In a traffic state, an example mobile device 150, 160, 170 may be sending/receiving traffic data (e.g. voice, text, etc.) and/or control data to/from corresponding base stations 120, 130, 140, respectively.

Figure 2:
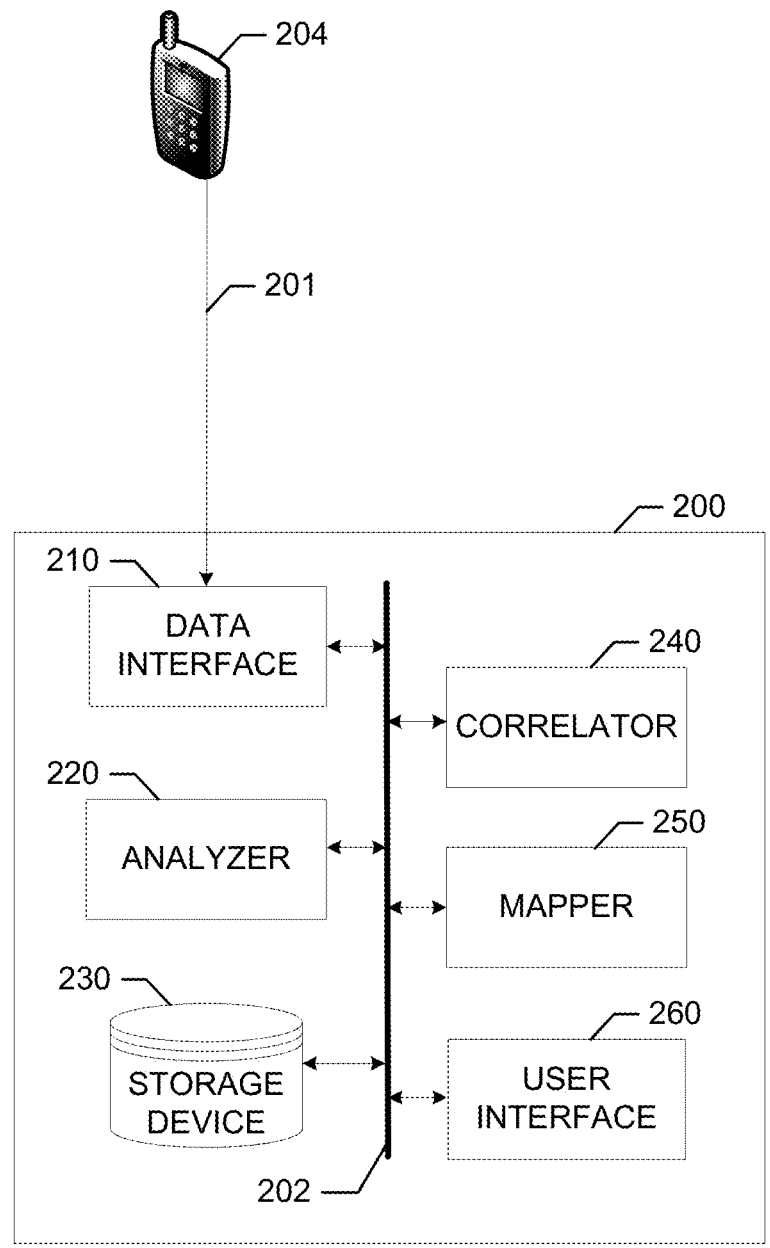
FIG. 2 is a block diagram of the example collector of FIG. 1 constructed in accordance with the teachings of this disclosure to monitor spectrum usage of mobile carriers.

FIG. 2 is a block diagram of an example collector 200 that may be used in the illustrative example environment 100 and may implement the collector 200 of FIG. 1. The example collector 200 includes an example data interface 210, an example analyzer 220, an example storage device 230, an example correlator 240, an example mapper 250, and an example data output 260. The example collector 200 includes an example communication bus 202 that facilitates communication between the data interface 210, analyzer 220, storage device 230, correlator 240, mapper 250, and data output 260 of the illustrated example.

The example collector 200 of FIG. 2 receives data from a mobile device 204, which may be implemented by the example mobile devices 150, 160, 170 of FIG. 1, through a communication link 201. The example communication link 201 may be wireless and/or wired (e.g. USB, etc.).

The example data interface 210 of FIG. 2 receives (1) the network parameter(s) and channel information, and/or (2) messages including the network parameter(s) and/or channel information from the example mobile device 204. For instance, in some examples, the mobile device 204 extracts the network parameter(s) and/or channel information from one or more received messages (e.g., any of the messages 125, 134, 139, 145 of FIG. 1. In such examples, the mobile device 204 forwards the network parameter(s) and/or channel information to the collector 200 of FIG. 2 via the communication link 201. In other examples the mobile device 204 forwards the one or more messages to the collector 200 via the communication link 201 without extracting the network parameter(s) and/or channel information. In such examples, the collector 200 includes a data extractor to extract the network parameter(s) and/or the channel information from the messages. The network parameter(s), channel information, and/or message(s) including the network parameter(s) and/or channel information are forwarded to the example storage device 230 via the bus 202. In examples employing data extraction, the data extractor stores the network parameter(s) and/or channel information in the storage device 230.

In the illustrated example of FIG. 2, the analyzer 220 retrieves the channel information (e.g., the channel information from the fields 122, 132, 136, 142 of FIG. 1) from the storage device 230. The example analyzer 220 of FIG. 2 then determines which mobile carrier provided the channel information to the mobile device 204. In some examples, the example analyzer 220 determines the mobile carrier through the network parameters (e.g., the network parameters identified in the fields 121, 131, 135, 141 of FIG. 1). In some examples, the analyzer 220 of the collector 200 has access to an example network allocation list indicating mobile radio communications spectrum assigned to some or all mobile carriers (e.g. the first and second mobile carriers X,Y) in a geographic location (e.g. a city, a state, etc.). In some examples, the analyzer 220 of FIG. 2 has access to an example network identification list (e.g. the network parameters) for some or all mobile carriers in a location. Accordingly, the example analyzer 220 of FIG. 2 may cross-reference the received channel information and/or network parameters with the example network allocation list and/or the example network identification list. The example analyzer 220 stores the channel information in a mobile carrier database for the identified mobile carrier in the example storage device 230.

In the illustrated example, the correlator 240 of FIG. 2 identifies example channel information (e.g., the channel information in the fields 122, 132, 136, 142 of FIG. 1) for an example mobile carrier and correlates the channel information with previously stored channel information having the same and/or similar network parameters (e.g., the network parameters in the fields 121, 131, 135, 141 of FIG. 1) in the storage device 230. For example, the example correlator 240 may determine that two or more groups of channel information have at least one of the same network parameters (e.g. a same cell ID, BCCH, MCC, MNC, LAC, etc.) of a mobile carrier, indicating that the channel information is related to the same network, base station, etc.

For example, referring to FIGS. 1 and/or 2, assume the collector 200 retrieves the network parameter(s) and channel information from the messages 134, 139 via the communication links 151, 161 from the first and second mobile devices 150, 160. The example analyzer 220 of FIG. 2 determines the messages 134, 139 are from the first mobile carrier X and/or the second base station 130 based on the identified BCCH 698 in the field 131 of the message 134 and the identified MNC 10107 in the field 135. The example correlator 240 of FIG. 2 correlates and/or stores the channel information from the fields 132, 136 with channel information for the second base station 130 in a database for the first mobile carrier X in the storage device 230.

The example mapper 250 of FIG. 2 identifies the correlated channel information in the storage device 230 and maps usage characteristics (e.g., channel allocation ratio, frequency hopping lists, etc.) for a mobile carrier network based on the identified correlated channel information. In some examples, the mapper 250 receives a request via the user interface 260 to display an example usage characteristic for an example mobile carrier network. The example request may include one or more types of the usage characteristics to be displayed and one or more types of graphical representation(s) for displaying the usage characteristic(s). In some examples, the mapper 250 of FIG. 2 generates graphical representation data and submits the data to the user interface 260 for rendering of a display of the requested graphical representation. In some examples, the mapper 250 stores the mapped data in storage device 230.

While an example manner of implementing the example collector 200 has been illustrated in FIG. 2, one or more of the elements, processes and/or devices illustrated in FIG. 2 may be combined, divided, re-arranged, omitted, eliminated and/or implemented in any other way. Further, the example data interface 210, the example analyzer 220, the example correlator 240, the example mapper 250, and the example user interface 260 and/or, more generally, the example collector 200 of FIG. 2 may be implemented by hardware, software, firmware and/or any combination of hardware, software and/or firmware. Thus, for example, any of the example data interface 210, the example analyzer 220, the example correlator 240, the example mapper 250, the example user interface 260 and/or, more generally, the example collector 200 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus claims of this patent are read to cover a purely software and/or firmware implementation, at least one of the example data interface 210, the example analyzer 220, the example correlator 240, the example mapper 250, and/or the example user interface 260 are hereby expressly defined to include a tangible and/or non-transitory computer readable storage medium such as a memory, a digital versatile disk DVD, CD, etc. storing the software and/or firmware. Further still, the example collector 200 of FIG. 2 may include one or more elements, processes and/or devices in addition to, or instead of, those illustrated in FIG. 2, and/or may include more than one of any or all of the illustrated elements, processes and devices.

Figure 3:
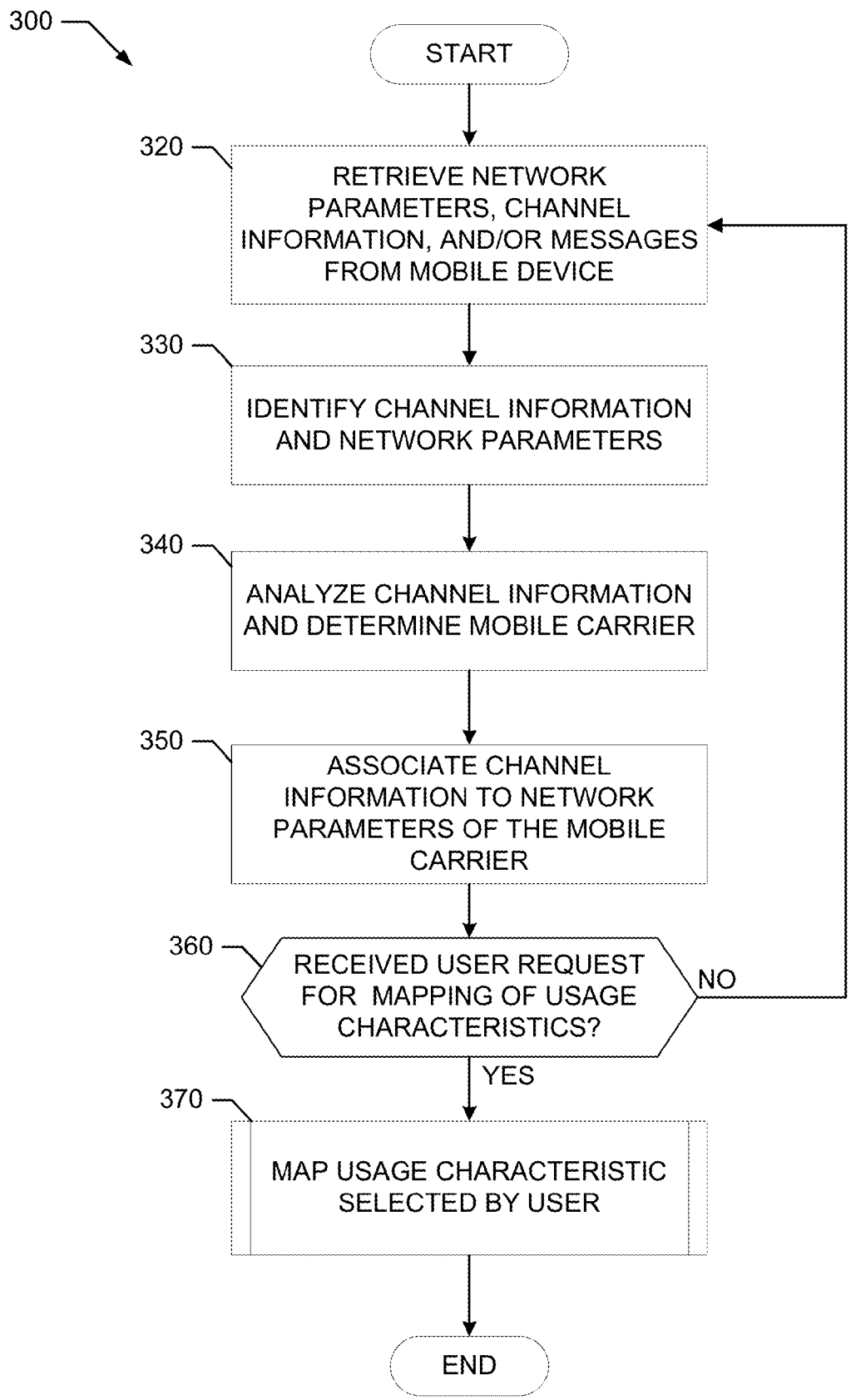
FIGS. 3-4 are flow charts representative of example machine readable instructions that may be executed to implement the example apparatus of FIGS. 1 and/or 2.
Figure 4:
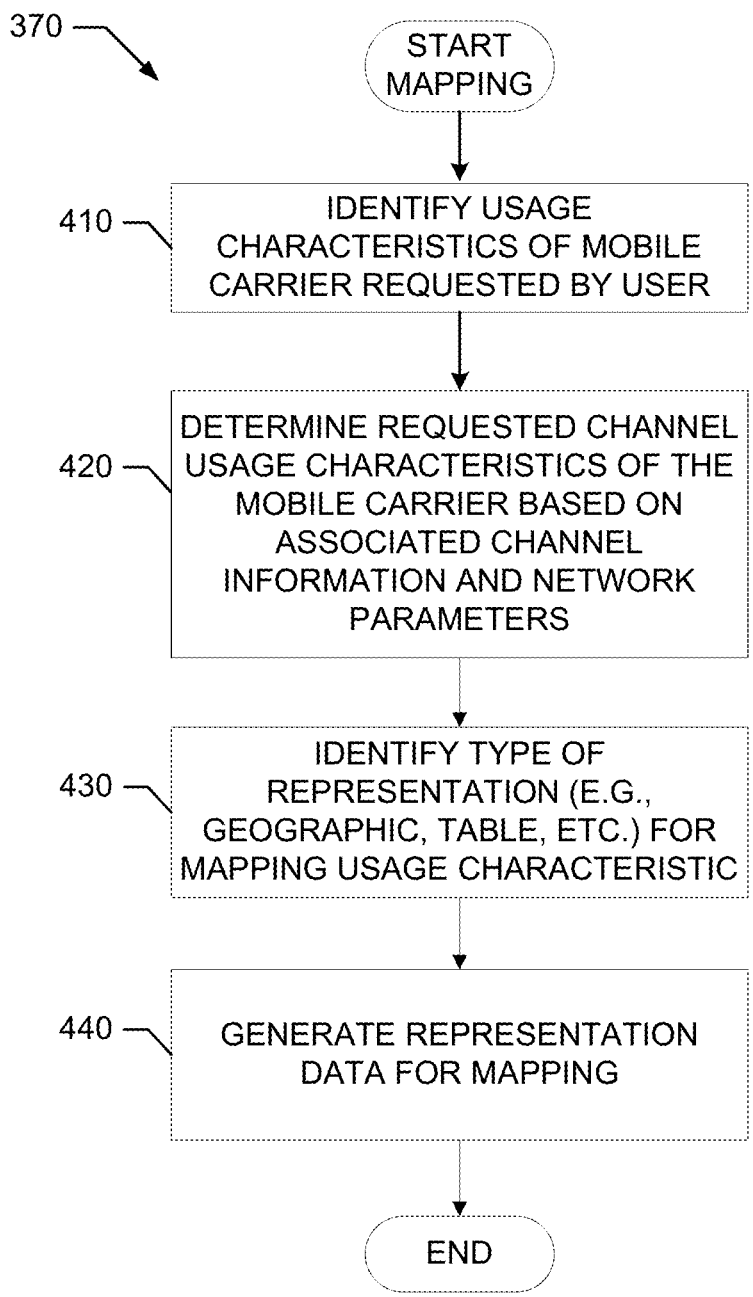

Flowcharts representative of example machine readable instructions for implementing the example collector 200, and in particular the example data interface 210, the example analyzer 220, the example correlator 240, the example mapper 250, and the example user interface 260 of FIG. 2 are shown in FIGS. 3-4. In this example, the machine readable instructions comprise a program for execution by a processor such as the processor 1112 shown in the example processor platform 1100 discussed below in connection with FIG. 11. The program may be embodied in software stored on a tangible computer readable storage medium such as a CD-ROM, a floppy disk, a hard drive, a digital versatile disk (DVD), a Blu-ray Disc™, or a memory associated with the processor 1112, but the entire program and/or parts thereof could alternatively be executed by a device other than the processor 1112 and/or embodied in firmware or hardware. Further, although the example program is described with reference to the flowcharts illustrated in FIGS. 3-4, many other methods of implementing the example collector 200 of FIG. 2 and in particular the example data interface 210, the example analyzer 220, the example correlator 240, the example mapper 250, and/or the example user interface 260 may alternatively be used. For example, the order of execution of the blocks may be changed, and/or some of the blocks described may be changed, eliminated, or combined.

As mentioned above, the example processes of FIGS. 3-4 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a Blu-ray Disc™, a cache, a random-access memory (RAM)) and/or any other storage device or storage disc (e.g., a magnetic disc, and optical disc, etc.) in which information is stored for any duration (e.g., for extended time periods, permanently, brief instances, for temporarily buffering, and/or for caching of the information). As used herein, the term tangible computer readable storage medium is expressly defined to include any type of computer readable storage device and/or storage disc and to exclude propagating signals. Additionally or alternatively, the example processes of FIGS. 3-4 may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable storage medium is expressly defined to include any type of computer readable storage device and/or storage disc and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim Example machine readable instructions 300 that may be executed to implement the collector 200 of FIGS. 1 and/or 2 are represented by the flow chart shown in FIG. 3. At block 320, the example data interface 210 of FIG. 2 retrieves the network parameter(s) from the network parameter fields 121, 131, 135, 141, channel information from the channel information fields 122, 132, 136, 142, and/or the messages 125, 134, 139, 145 (e.g., Layer 3 messages) from the mobile devices 150, 160, 170 of FIG. 1 via one or more of a wireless or wired communication protocol. The data interface 210 stores the retrieved channel information, network parameter(s), and/or messages 125, 134, 139, 145 in the storage device 230.

At block 330, the analyzer 220 identifies the channel information and network parameters. In some examples, the channel information that is received from the mobile device depends on the communication protocol (e.g. GSM, CDMA, DC-HSDPA, etc.) of the mobile network and/or the state (e.g. idle or traffic) of the mobile device when receiving the channel information.

In some examples involving a GSM network (e.g., the network of the first mobile carrier X), at block 330 of FIG. 3, the channel information in the channel information fields 122, 132, 136 is extracted by the mobile devices 150, 160 and/or the analyzer 220 from the messages 125, 134, 139 received from the base stations (e.g., the base stations 120, 130) of the GSM network. In some examples involving a GSM network, when the mobile devices 150, 160 are in an idle state (e.g. not transmitting traffic data, such as voice, text, etc.), the mobile devices 150, 160 receive the messages 125, 134, 139. Such messages may be, for example Layer 3 messages (e.g., System Information Type2 (SIB2) and/or System Information Type2ter (SIB2ter)). Example Layer 3 messages which may be received in an idle state may include Neighbor Cell Description information in the channel information fields 122, 132, 136, (e.g., a RACH and/or BCCH allocation list identifying absolute radio frequency channel numbers (ARFCNs) available in the surrounding cells). Further, in an idle state, mobile devices may receive System Information Type 3 messages including example network parameters in the network parameter fields 121, 131, 135 of the first mobile carrier X of FIG. 1.

In some examples, when a mobile device is in a traffic state of a GSM network during which the mobile device is transmitting and or receiving voice, text, data, etc., the base stations (e.g., the base stations 120, 130) send BCCH allocation information on the slow access control channel (SACCH). Example Layer 3 messages for a GSM network (e.g., System information Type 5 (SIB5) and/or System Information Type 5ter (SIB5ter)), include the same Neighbor Cell description information in the channel information fields 122, 132, 136 as described herein when the mobile devices 150, 160 are in an idle state. In such examples, when establishing mobile origination and termination calls in a GSM network, the base stations 120, 130 assign traffic channel resources (e.g., by using the channel information fields 122, 132, 136) to the mobile devices 150, 160 through an Assignment Command. As part of a handoff process, the base stations 120, 130 send a Handoff Command on the fast associated control channel (FACCH). In such examples, the Assignment Command and/or Handoff Command for a GSM network include a frequency list information that identifies absolute radio frequency channel numbers (ARFCNs) used in mobile frequency hopping. Accordingly, when the mobile devices 150, 160 are in a traffic state in a GSM network, the channel information extracted by the mobile devices 150, 160 and/or the analyzer 220 from the Layer 3 messages may include a frequency hopping list.

In some examples (e.g., the network of the second mobile carrier Y), at block 330 of FIG. 3, the channel information in the channel information field 142 is extracted by the mobile device 170 and/or the analyzer 220 from the message 145 received from base stations (e.g., the base station 140) of the CDMA network. In some such examples, when the mobile device 170 is in an idle state (e.g. not transmitting traffic data, such as voice, text, etc. via the CDMA network), the mobile device 170 receives the message 145. In such examples, the message 145 may be a Layer 3 message, (e.g., a Sync Channel Message (SCM), a CDMA Channel List Message (CCLM), or an Extended CDMA Channel List Message (ECCLM)), which include the CDMA carrier frequencies. In such examples, the CCLM and/or the ECCLM may identify of one or more channel numbers (e.g., the channel information in the channel information field 142) mapped to actual frequencies of the mobile carrier. In some such examples, the mobile devices 170 may use a hashing algorithm to determine the final channel number to be used while the mobile device 170 is in an idle state. Accordingly, in such examples, the mobile device 170 and/or the analyzer 220 extract the above example channel information from the message 145.

In examples which the mobile device 170 is in a traffic state in a CDMA network, the mobile device 170 receives the message 145 (e.g., a Channel Assignment Message (CAM) and/or an Extended Channel Assignment Message (ECAM)), on the Forward Traffic Channel of the CDMA network from the base station 140. In some examples, once the mobile device 170 is in a traffic state the devices may encounter a need for a hard handoff to transfer the mobile device 170 communication session to another frequency within the base station 140. In such examples, a set of Layer 3 messages 145 (e.g. Candidate Frequency Search Request Message (CFS-RQM), Candidate frequency Search Report Message (CFS-RPM), General Handoff Direction Message (GHDM), Extended Handoff Direction Message (EHDM), Universal Handoff Direction Message (UHDM)) between the mobile device 170 and corresponding base station 140 are exchanged. In such examples, the exchanged messages 145 include frequency assignments for the base stations 140 to which the mobile device 170 should tune for establishing communication on the new frequency. Accordingly, the mobile device 170 and/or the analyzer 220 can extract and store the above channel information in the channel information field 142 for the second mobile carrier Y.

In some examples, the analyzer 220 extracts the channel information and network parameters from the messages 125, 134, 139, 145. In some examples, the analyzer 220 stores the extracted channel information in the storage device 230 based on the extracted channel information in the channel information fields 122, 132, 136, 142 and/or network parameters in the network parameter fields 121, 131, 135, 141.

At block 340 of FIG. 3, the example analyzer 220 identifies a mobile carrier (e.g. the first mobile carrier X and/or the second mobile carrier Y) originating the messages 125, 134, 139, 145. In some examples, the analyzer 220 determines the mobile carrier based on the network parameters in the network parameter fields 121, 131, 135, 141 of the messages 125, 134, 139, 145. In some examples, the analyzer 220 stores the channel information from the channel information fields 122, 132, 136, 142 in a database for the corresponding mobile carrier X, Y in the storage device 230.

At block 350 of FIG. 3, the correlator 240 identifies example channel information (e.g., the channel information in the channel information fields 122, 132, 136, 142) associated with one or more mobile carriers (e.g. the first mobile carrier X and/or the second mobile carrier Y). The example correlator 240 then associates the channel information with the network parameters for the carrier. For example, channel information may include frequency hopping information and base station information. For instance, message 134 of FIG. 1 identify channel numbers 704, 708, 713 in the channel information field 132 and identifies the base station 130 based on BCCH 698 in network parameter field 131. A second sample of channel information from channel information field 136 may indicate a different hopping list than that identified in the channel information field 132. The example channel information in channel information field 136 may be correlated with the channel information in the channel information field 132 for the base station 130, thereby indicating that base station 130 of the first mobile carrier X has a frequency hopping list including the channels identified in the channel information fields 132, 136. Furthermore, the correlator 240 may determine the types of channels (e.g. BCCH or traffic channels) included in the list and may correlate the information based on channel type.

In some examples, the mapper 250 of FIG. 2 receives a request from the example user interface 260 to map a mobile carrier's usage characteristics on a display. If the mapper 250 does not receive a request to map usage characteristics, control returns to block 320. If the mapper 250 does receive a request to map usage characteristics, at block 370, the mapper 250 maps the usage characteristic.

At block 370, the mapper 250 maps the identified usage characteristic. In some examples the mapper 250 stores the mapped usage characteristics in storage device 230. In some examples the mapped usage characteristics are rendered by the mapper 250 for display via the user interface 260 For example, a user may request a channel allocation table for a mobile carrier. In some examples, the mapper 250 identifies corresponding geographical locations of the correlated channel information. In some examples, the mapper 250 may determine the geographic locations based on GPS measurements retrieved by the mobile devices 150, 160, 170 at the time of receipt and/or transmission of the messages. In some examples, the mapper 250 determines the geographic location associated with the channel information based on a base station identifier, network identifier, sector identifier or the like that is included in the example network parameters of Layer 3 messages, described herein. Accordingly, in some examples, the mapper 250 renders the example channel information to corresponding geographic locations for display. The example displays allow a user to identify channel allocation and/or a frequency hopping list for a mobile carrier network in a certain geographic area.

FIG. 4 illustrates example machine readable instructions 370 that may be executed to implement the block 370 of FIG. 3. At block 410, the mapper 250 identifies the usage characteristics of a mobile carrier (e.g. the first mobile carrier X or the second mobile carrier Y) correlated based on one or more network parameters (e.g the network parameters in the network parameter fields 121, 131, 135, 141). In some examples, the mapper 250 receives instructions to identify a specified usage characteristic for one or more mobile carriers indicated by a user via user interface 260. In such examples, the mapper 250 retrieves the corresponding usage characteristics from channel information (e.g., the channel information in the channel information fields 122, 132, 142) correlated to network parameters of the mobile carriers (e.g. Carriers X, Y).

At block 420 of FIG. 4, example mapper 250 of FIG. 2 determines channel one or more usage characteristic(s) for a mobile carrier (e.g., the first mobile carrier X or the second mobile carrier Y) based on associated channel information and/or network parameters. In some examples, a first usage characteristic for a GSM network (e.g. the network of the first mobile carrier X) is reflected a channel allocation ratio for control usage defined by the number of channels for broadcast control channels (BCCH) divided by the total number of distinct channels ($CH_{total}$) in the mobile carrier network (i.e. $BCCH/CH_{total}$). In some examples, a second usage characteristic for a GSM network is reflected by a channel allocation ratio for traffic usage (TCH), defined by the number of channels for traffic divided by the total number of distinct channel in the mobile carrier network (i.e. $TCH/CH_{total}$). In some examples, a third usage characteristic for a GSM network is reflected by a channel allocation ratio for shared control and traffic (BCCH&TCH), defined by the number of shared channels divided by the total number of distinct channels in the network (i.e. $BCCH\&TCH/CH_{total}$). In some examples, a fourth usage characteristic for a GSM network is a frequency hopping list. In some examples, a fifth usage characteristics for a CDMA network (e.g. the network of the second mobile carrier Y) is a total radio frequency spectrum for the mobile carrier. In some examples, a sixth usage characteristic is a channel allocation for each sector of a network cell of the mobile carrier.

At block 430, the mapper 250 identifies the type of representation the user wishes to use to map the usage characteristic(s). In some examples, the user requests a table to map the usage characteristic of a mobile carrier (e.g., see FIGS. 6, 7, 9). In some examples, the user requests a geographic map of the usage characteristics of a mobile carrier (e.g, see FIGS. 8, 10). In some examples, the type of representation for mapping the usage characteristic of the mobile carrier depends on the type of usage characteristic that is requested. At block 440, the mapper generates the representation data for mapping the usage characteristic(s) of the mobile carrier.

Figure 5:
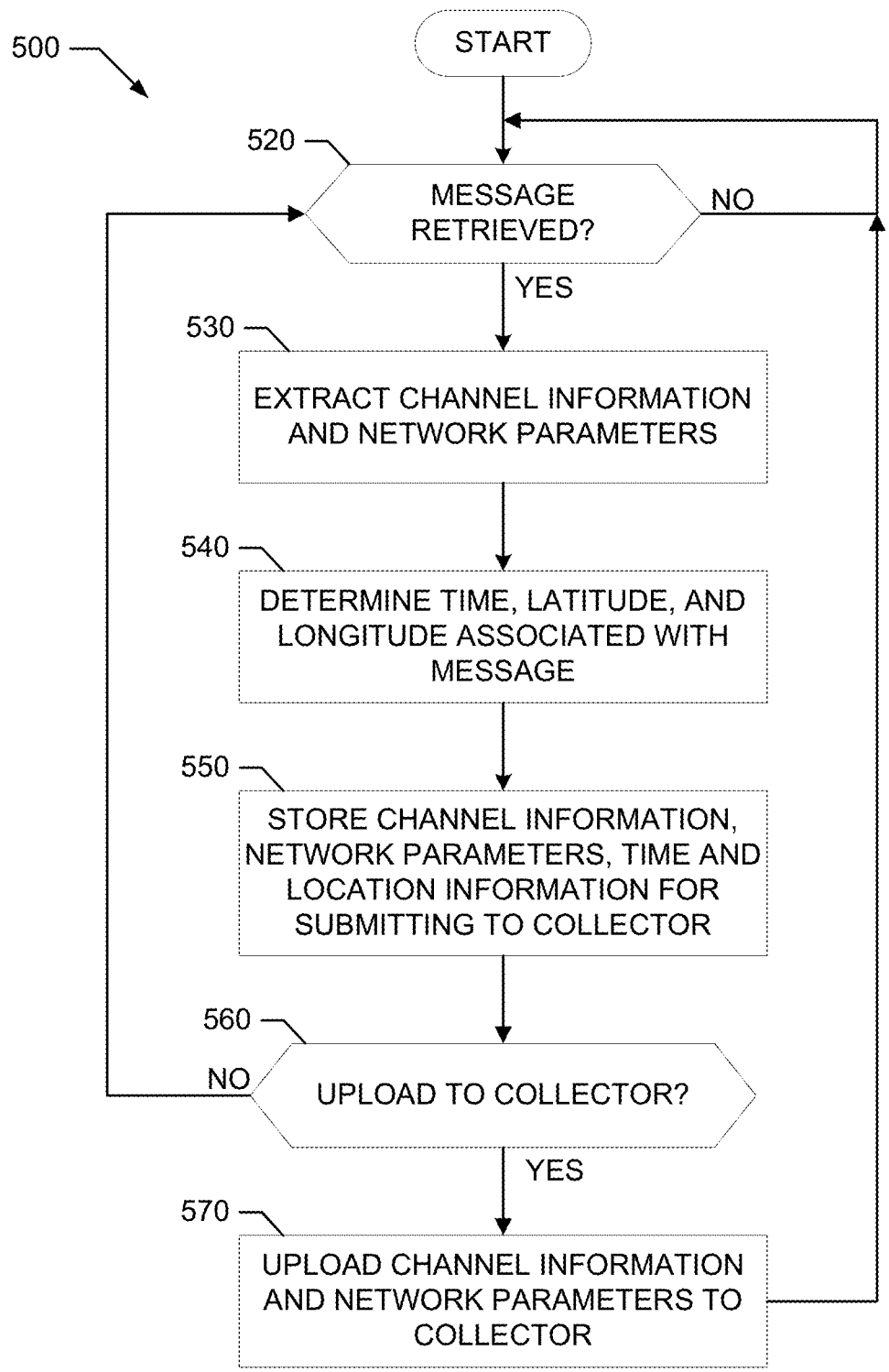
FIG. 5 is a flow chart representative of example machine readable instructions that may be executed to implement the example mobile devices of FIGS. 1 and/or 2.

Example machine readable instructions 500 that may be executed by the mobile devices 150, 160, 170 of FIG. 1 are represented by the flowchart shown in FIG. 5. In some examples, mobile devices 150, 160, 170 are capable of extracting channel information from the channel information fields 122, 132, 136, 142 of messages 125, 134, 139, 145 to be submitted to collector 200. The example machine readable instructions 500 represent such an extraction.

At block 520, the mobile devices 150, 160, 170 determine whether a message 125, 134, 139, 145 (e.g. Layer 3 messages) has been received. If a message has not been received, the instructions continue to loop at block 520 until a message is received. When a message is received (block 520), control advances to block 530.

At block 530 of FIG. 5, the example mobile devices 150, 160, 170 extract channel information from the channel information fields 122, 132, 136, 142 and network parameters from the network parameter fields 121, 131, 135, 141 of the received message 125, 134, 139, 145. In some examples utilizing a GSM network, the mobile devices 150, 160, 170 extract a GSM_FREQ field from a received GSM Layer 3 message (e.g. SIB2, SIB2ter, SIB5, SIB5ter). In some examples utilizing a CDMA network, the mobile devices 150, 160, 170 extract a PILOT_PN and/or CDMA_FREQ from a received CDMA Layer 3 message (e.g. SCM, CCLM, ECCLM, CAM, ECAM, CFSRQM, CFSRPM, GHDM, EHDM, UHDM).

In some examples, at block 540 of FIG. 5 the mobile device 150, 160, 170 may determine a time and/or geographic location (latitude/longitude) included with a message (e.g. by accessing the UTC_TIME, MS_LAT, MS_LONG, and/or CALL_STATE fields of the above example Layer 3 messages). At block 540 of FIG. 5, the example mobile devices 150, 160, 170 store the extracted channel information. AT block 550, the example mobile devices 150, 160, 170 store the channel information, network parameters, time, and/or location to a storage device (e.g., locally on the mobile devices, and/or at a server connected to a network of the corresponding mobile carrier).

At block 560, the mobile devices 150, 160, 170 determine whether the channel information and/or network parameters with corresponding time and geographic location information is to be uploaded to the collector 200. If no upload is to occur, control returns to block 520. If an upload is to occur, after the example mobile devices 150, 160, 170 establish a wireless and/or wired (e.g. USB) connection with example collector 200, the stored information is transmitted from the mobile devices 150, 160, 170 for analyzing, correlating, and/or mapping of the information.

Figure 6:
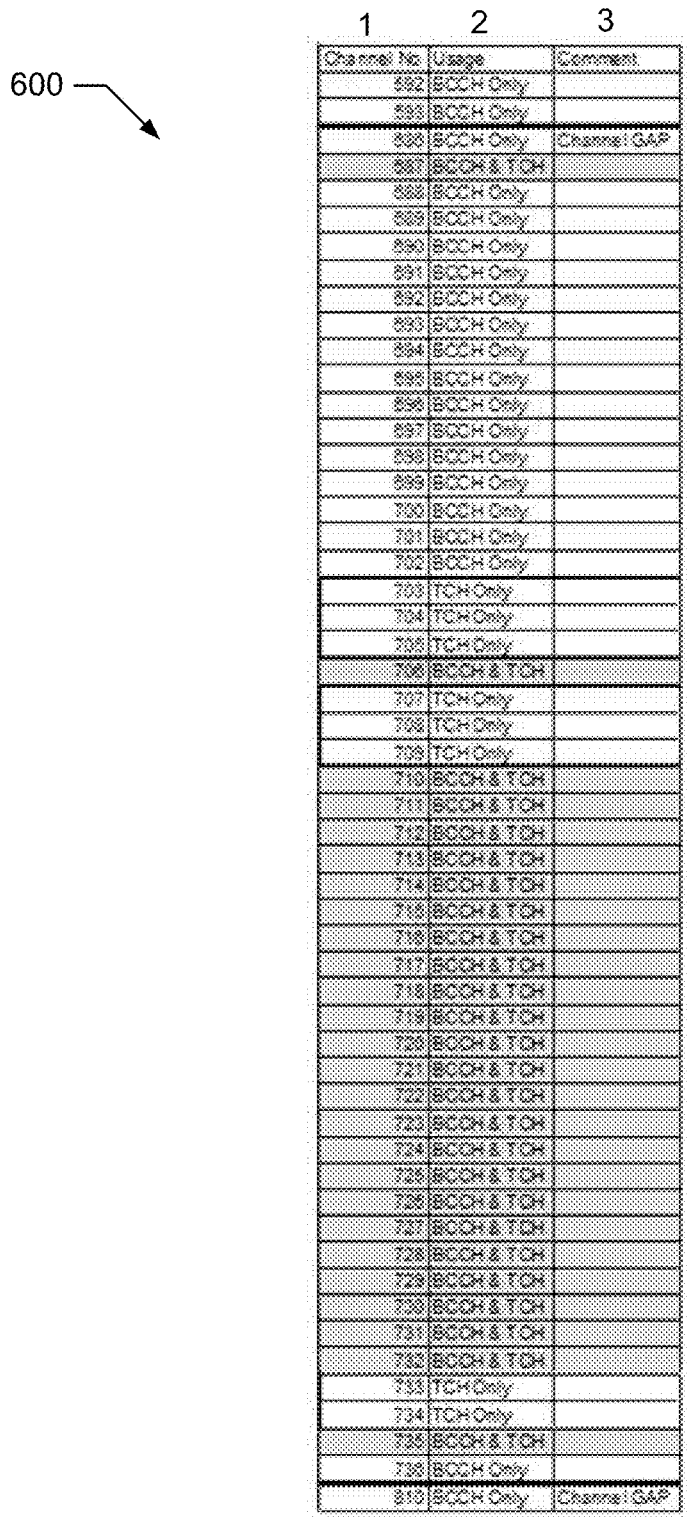
FIG. 6 is an example channel allocation table for an example global system for mobile communications (GSM) network that may be generated using the example apparatus of FIGS. 1 and/or 2.

FIG. 6 is an example channel allocation table 600 indicating channel usage characteristics of channels of a GSM network. The example channel allocation table 600 of FIG. 6 identifies the channels of a network Column 1, a usage for that channel in Column 2, and a comment field in Column 3. In some examples, the channel allocation table 600 may be generated and/or rendered by mapper 250 for display on user interface 260 of the example collector 200 of FIG. 2. In such examples, the mapper 250 retrieves channel information from storage device 230 that was correlated by the correlator 240 based on mobile carrier channel number and usage type (BCCH and/or TCH). Accordingly, a usage characteristic is identified in column 2 for each channel of column 1. In some examples, the mapper 250 may be able to determine a control channel allocation ratio, a traffic channel allocation ratio, and/or a shared channel allocation ratio based on the same information used to generate the allocation table 600 of FIG. 6.

FIG. 7 is an example of a frequency hopping list 700 indicating channel usage at a designated location of a GSM network generated by the example collector 200 of FIGS. 1 and/or 2. The example frequency hopping list of FIG. 7 identifies the channel location number (1-42) in column 1 and the channel numbers available for use in frequency hopping at that location in column 2. For example, Location 1 has channels 703, 706, and 734 available when a handoff command is received by a mobile device in the GSM network. In some examples, the collector 200, may have received several messages including channel information for Location 1, and the correlator 240 correlated the channel information from each of the messages to the corresponding base station identification network parameter from associated Layer 3 messages. In some examples, mapper 250 retrieves the correlated data and generates the channel allocation table of FIG. 7 and/or a geographic representation of the channel allocation table as presented in FIG. 8.

Figure 8:
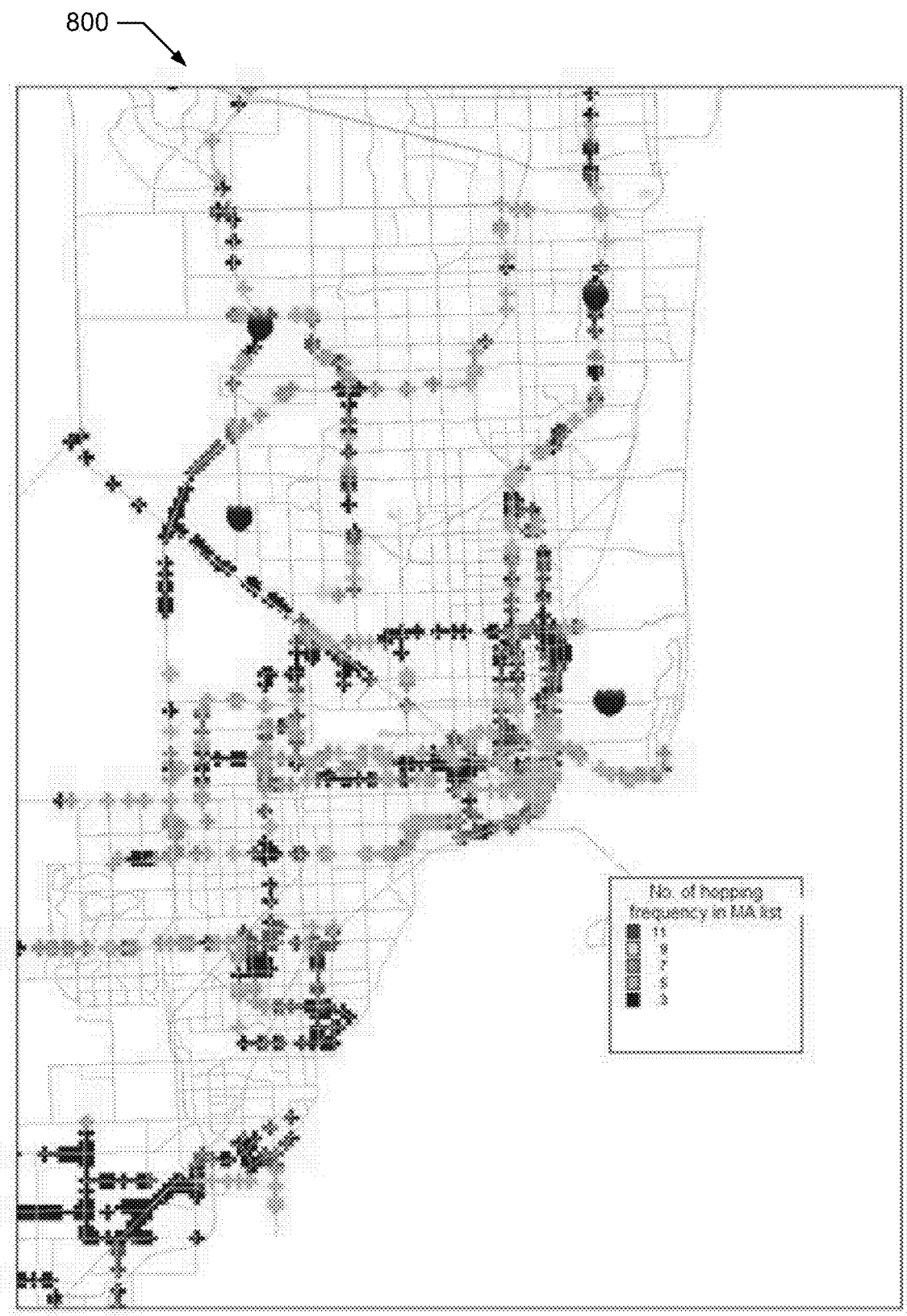
FIG. 8 is an example mapping of an example frequency hopping list that may be generated using the example apparatus of FIGS. 1 and/or 2.

FIG. 8 is an example mapping 800 of an example frequency hopping list, such as the example list of FIG. 7, generated using the example collector 200 of FIGS. 1 and/or 2. In FIG. 8, shaded areas of the geographic map correspond to the number hopping frequencies at a given location. Accordingly, the example geographic map shows a channel allocation distribution across a certain location, indicating the spectrum availability of the mobile carrier. Such an example geographic map may be useful in determining reliability for mobile service. All things being equal, in the example mapping 800, locations having 11 hopping frequencies may be more reliable than those locations with only 3 hopping frequencies available. However, the mobile carrier may allocate the 11 frequencies to a location with a higher amount traffic and/or larger population than the location with only 3 available hopping frequencies, thus increasing the reliability.

In some examples, the mapper 250 generates the geographic map by referencing geographic locations corresponding to either the transmission or receipt of the messages carrying the channel information. In such examples, the geographic location may be determined based on a location of the corresponding base station identified by the network parameters of associated messages and/or corresponding geographic locations recorded by a GPS of the mobile device.

Figure 9:
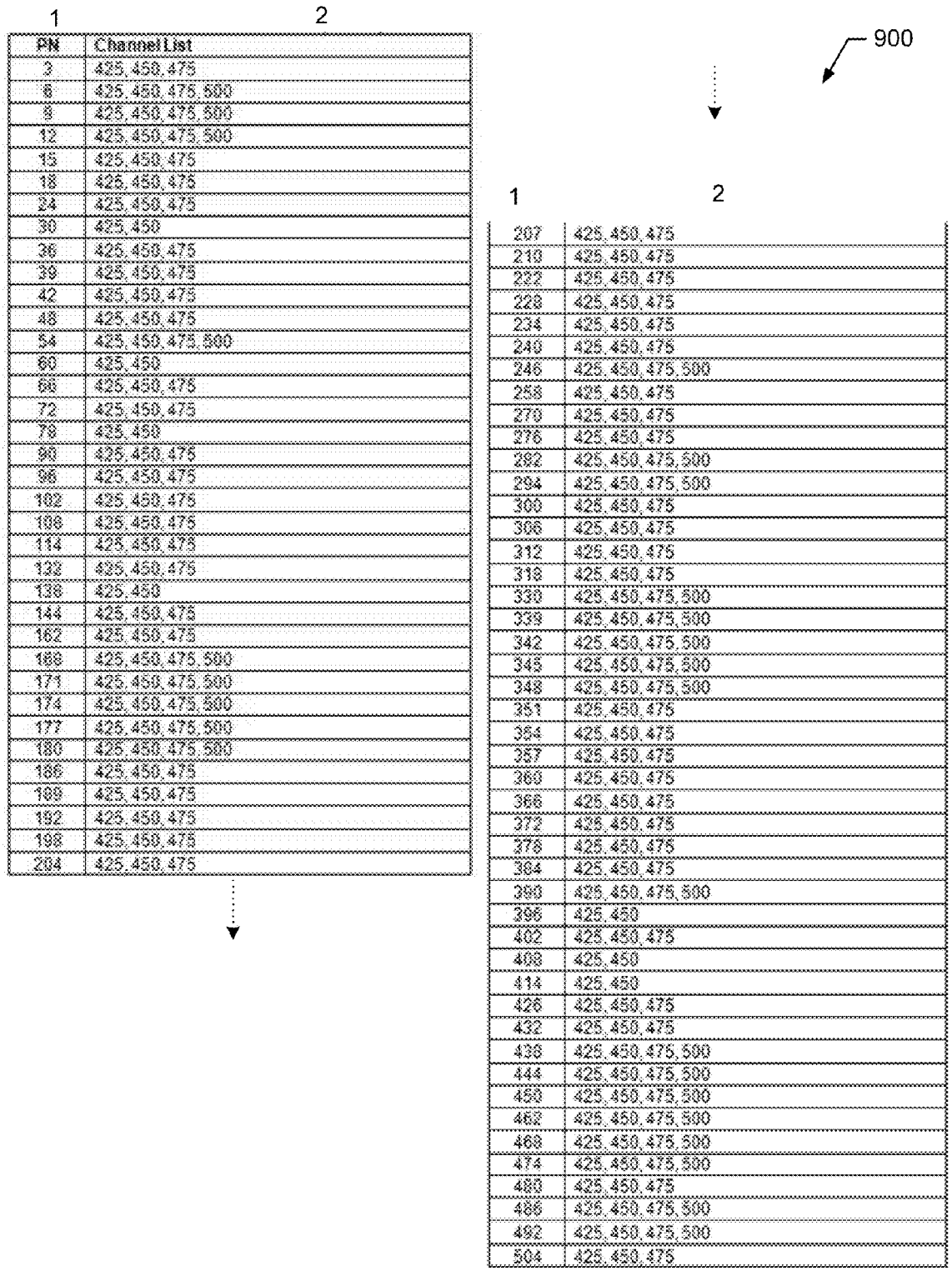
FIG. 9 is an example channel allocation table for an example code division multiple access (CDMA) network that may be generated using the example apparatus of FIGS. 1 and/or 2.

FIG. 9 is an example channel allocation table for an example code division multiple access (CDMA) network that may be generated using the example apparatus of FIGS. 1 and/or 2. Example channel allocation table 900 includes a PN sector number in column 1 and the channel numbers available for use in that sector in column 2. The channel allocation table 900 is a table the channel allocation for each sector of a network cell of the mobile carrier. In some examples, a table identifying the total radio frequency spectrum for the mobile carrier can be generated using information from the allocation table 900 and/or from stored identified frequencies used to generate the allocation table 900.

For example, PN Sector 3 has channels 425, 450, and 475 available when a handoff command is received by a mobile device in the CDMA network. In some examples, the collector 200 may have received several messages including channel information for PN sector 3, and the correlator 240 correlated the channel information from each of the messages to the corresponding base station identification network parameter from associated Layer 3 messages, finding that channels 425, 450, and 475 were used by PN sector 3. In some examples, mapper 250 may then retrieve the correlated data and generate the frequency hopping channel usage table of FIG. 9 and/or a geographic representation of the channel usage as presented in FIG. 10.

Figure 10:
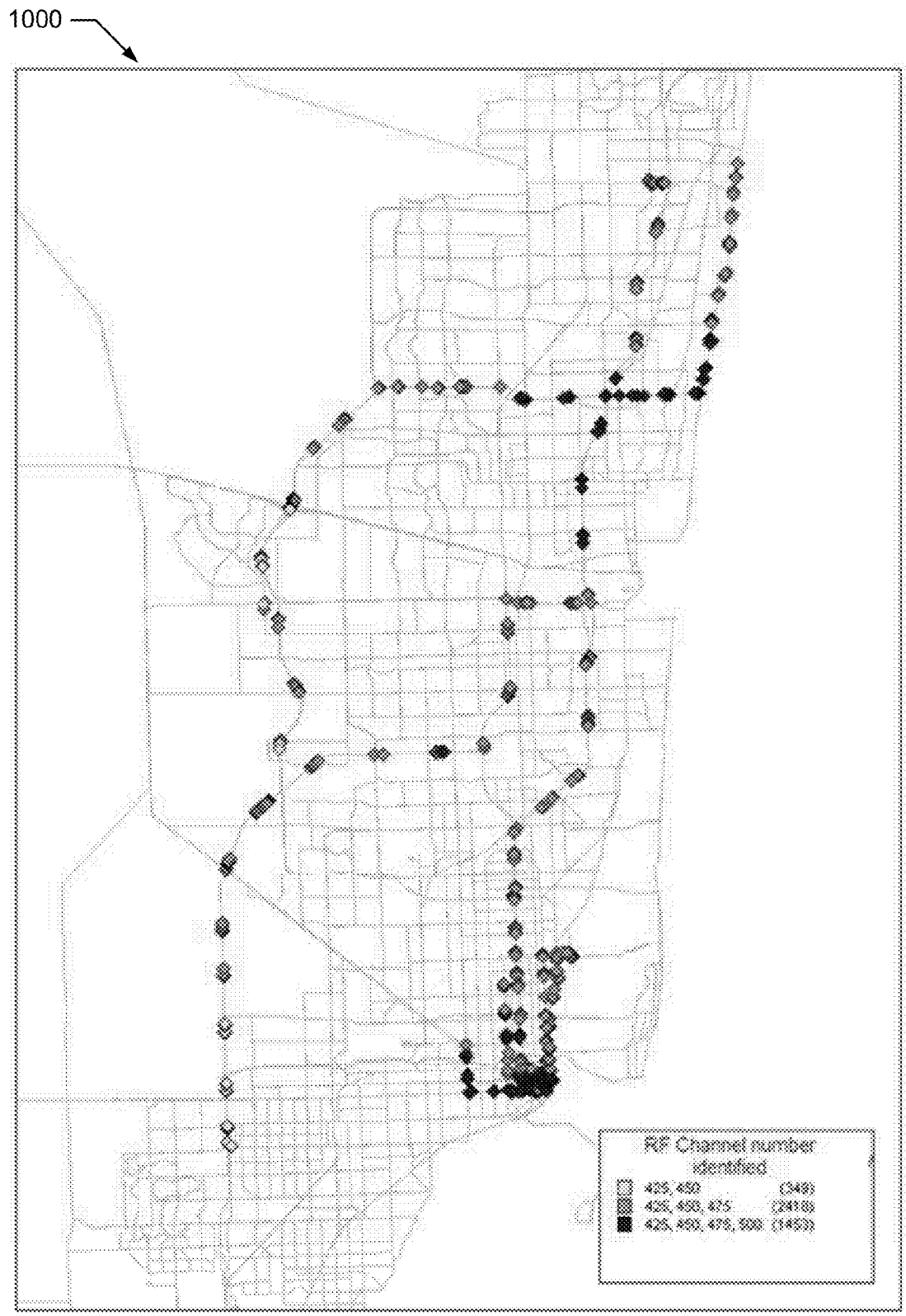
FIG. 10 is an example mapping of an example channel number allocation that may be generated using the example apparatus of FIGS. 1 and/or 2.

FIG. 10 is an example mapping 1000 of an example channel allocation such as the example table of FIG. 9. Example mapping 1000 may be generated using the example collector 200 of FIGS. 1 and/or 2. In FIG. 8, shaded areas of the geographic map correspond to the channel numbers used at a given location. Accordingly, the example geographic map of FIG. 8 shows a channel allocation distribution across a certain location, indicating the spectrum availability of the mobile carrier. Such an example geographic map may be useful in determining reliability for mobile service. All things being equal, in the example mapping 1000, locations having four available channels may be more reliable than those locations with only 2 available channels. However, the mobile carrier may allocate a greater amount of channels to an area having more traffic and/or a higher population, which would then affect the reliability.

In some examples, the mapper 250 may have generated the geographic map 1000 of FIG. 10 by referencing geographic locations corresponding to either the transmission or receipt of the messages carrying the channel information. In such examples, the geographic location may be determined based on a location of the corresponding base station identified by the network parameters of associated messages and/or corresponding geographic locations recorded by a GPS of the mobile device.

Figure 11:
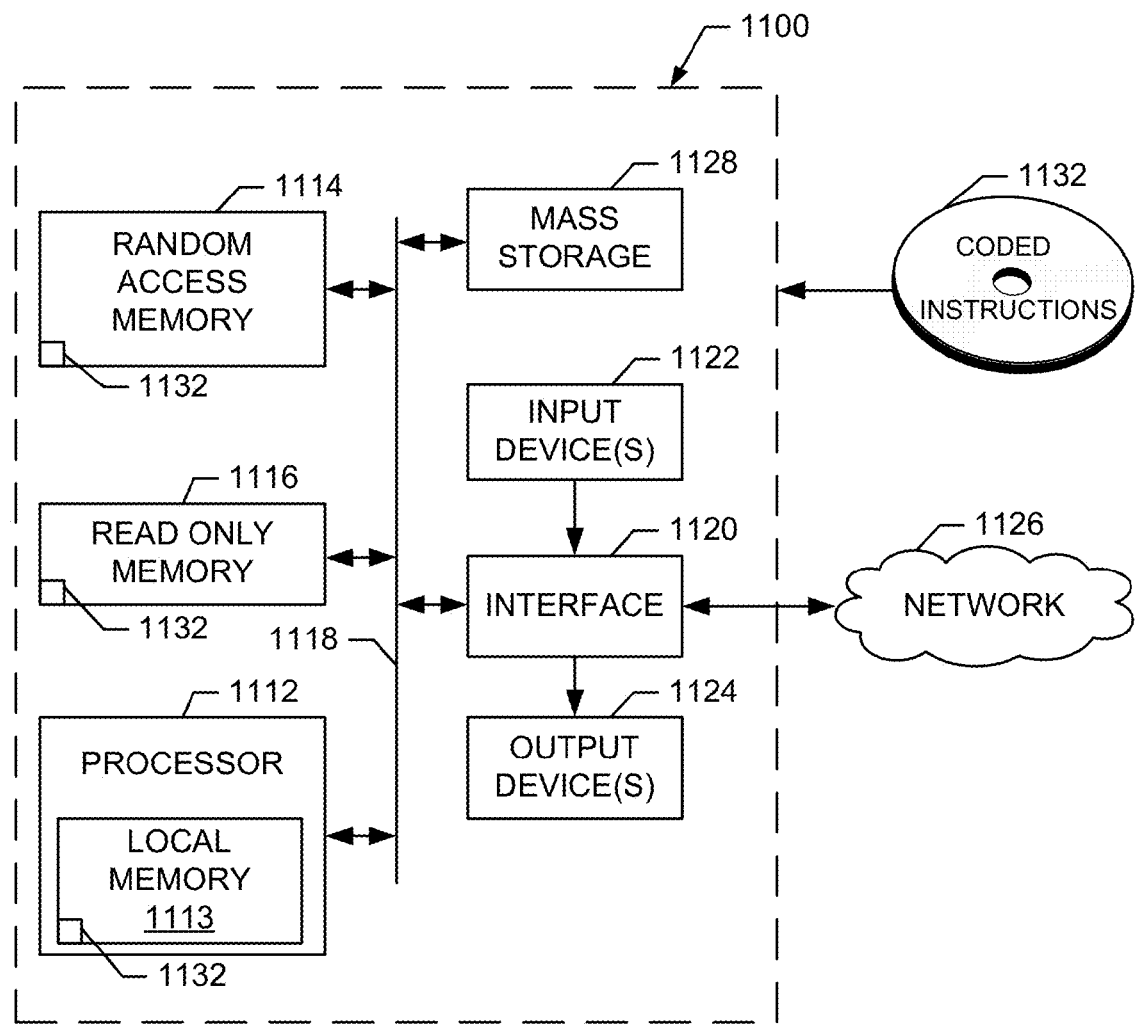
FIG. 11 is a block diagram of an example processor platform which may execute the instructions of FIGS. 3, 4, and/or 5 to implement the example apparatus of FIGS. 1 and/or 2.

FIG. 11 is a block diagram of an example processor platform 1100 capable of executing the instructions 300, 370, 500 of FIGS. 3-5 to implement the collector and/or mobile devices of FIGS. 1 and/or 2. The processor platform 1100 can be, for example, a server, a personal computer, a mobile phone (e.g., a cell phone). a personal digital assistant (PDA), an Internet appliance, or any other type of computing device.

The system 1100 of the instant example includes a processor 1112. For example, the processor 1112 can be implemented by one or more Intel® microprocessors from the Pentium® family, the Itanium® family or the XScale® family. Of course, other processors from other families are also appropriate.

The processor 1112 is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is typically controlled by a memory controller (not shown).

The processor platform 1100 also includes an interface circuit 1120. The interface circuit 1120 may be implemented by any type of interface standard, such as an Ethernet interface, a universal serial bus (USB), and/or a PCI express interface.

One or more input devices 1122 are connected to the interface circuit 1120. The input device(s) 1122 permit a user to enter data and commands into the processor 1112. The input device(s) can be implemented by, for example, a keyboard, a mouse, a touchscreen, a track-pad, a trackball, isopoint and/or a voice recognition system.

One or more output devices 1124 are also connected to the interface circuit 1120. The output devices 1124 can be implemented, for example, by display devices (e.g., a liquid crystal display, a cathode ray tube display (CRT), a printer and/or speakers). The interface circuit 1120, thus, typically includes a graphics driver card.

The interface circuit 1120 also includes a communication device such as a modem or network interface card to facilitate exchange of data with external computers via a network 1126 (e.g., an Ethernet connection, a digital subscriber line (DSL), a telephone line, coaxial cable, a cellular telephone system, etc.).

The processor platform 1100 also includes one or more mass storage devices 1128 for storing software and data. Examples of such mass storage devices 1128 include floppy disk drives, hard drive disks, compact disk drives and digital versatile disk (DVD) drives. The mass storage device 1028 may implement the local storage device 62.

The coded instructions 300, 370, 500 of FIGS. 3-5 may be stored in the mass storage device 1128, in the volatile memory 1114, in the non-volatile memory 1116, and/or on a removable storage medium such as a CD or DVD.

From the foregoing, it will appreciate that the disclosed methods, apparatus and/or articles of manufacture facilitate discovery of spectrum usage for one or more mobile carriers by identifying channel information received in messages and correlating the identified information to network parameters of the one or more mobile carriers to determine channel usage characteristics of the mobile carrier.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

The invention claimed is:

1. A method comprising:
extracting channel information from messages transmitted to mobile devices over a wireless communications radio spectrum;
identifying a number of channels contained in the channel information
which have network parameters associated with a same mobile carrier; and
determining a frequency hopping list associated with the mobile carrier based on the number of channels.

2. A method according to claim 1, wherein the channel information for messages received by the mobile devices in an idle state comprises at least one of random access channel allocation information or broadcast control channel allocation information in neighboring cells of a global system for mobile communications network.

3. A method according to claim 1, wherein the channel information for messages received by a mobile device in a traffic state comprises frequency hopping channel allocation information in neighboring cells of a global system for mobile communications network.

4. A method according to claim 1, wherein the network parameters comprise at least one of a cell identification, a broadcast control channel, a mobile country code, a network code, or a location area code.

5. A method according to claim 1, further comprising determining at least one of a channel allocation ratio for control usage, a channel allocation ratio for traffic usage, or a channel allocation ratio for shared control and traffic usage based on the number of channels contained in the channel information.

6. A method according to claim 1, wherein the channel information from messages received by at least one of the mobile devices in an idle state comprises at least one of a mobile carrier frequency or a channel number for use in a code division multiple access.

7. A method according to claim 1, wherein the channel information from messages received by at least one of the mobile devices in a traffic state comprises a traffic channel number for a corresponding cell in which the corresponding message was received or a handoff frequency of a neighboring cell in a code division multiple access network.

8. A method according to claim 1, wherein the network parameters comprise at least one of pseudo-noise offset, a base station identification, a system identification number, or a network identification number.

9. A method according to claim 1, further comprising determining at least one of a total radio frequency spectrum for the mobile carrier or a channel allocation for each sector of a network cell of the mobile carrier.

10. A method according to claim 1, wherein the network parameters comprise at least one of a pseudo-noise code for cell sector identification, a base station identification, a system identification number, or a network identification number.

11. A method according to claim 1, further comprising associating the channel information with second channel information associated with previously transmitted messages that used at least one of the same network parameters.

12. A method according to claim 1, further comprising mapping the frequency hopping list to at least one of a data table or corresponding geographic locations at which the messages were at least one of transmitted or received from mobile devices, wherein the corresponding geographic locations are determined based on the network parameters associated with the mobile carrier.

13. An apparatus comprising:
an analyzer to determine a number of channels contained in channel information and associated with a same mobile carrier, the channel information extracted from a plurality of messages transmitted to mobile devices over a wireless communications radio spectrum;
a correlator to associate network parameters extracted from the channel information with the mobile carrier; and
a mapper to determine a frequency hopping list for the mobile carrier based on the channels contained in the channel information.

14. An apparatus according to claim 13, wherein the channel information is received by a first one of the mobile devices in an idle state and comprises at least one of random access channel allocation or broadcast control channel allocation information in neighboring cells of a mobile communications network.

15. An apparatus according to claim 13, wherein the channel information is received by a first one of the mobile devices in a traffic state and comprises frequency hopping channel allocation information in neighboring cells of a mobile communications network.

16. An apparatus according to claim 13, wherein the network parameters comprise at least one of a cell identification, a broadcast control channel, a mobile country code, a network code, or a location area code.

17. An apparatus according to claim 13, further comprising determining at least one of a channel allocation ratio for control usage, a channel allocation ratio for traffic usage, or a channel allocation ratio for shared control and traffic usage based on the number of channels contained in the channel information.

18. An apparatus according to claim 13, wherein the channel information from the messages is received by at least one of the mobile devices in an idle state and comprises at least one of a mobile carrier frequency or a channel number for use in a code division multiple access.

19. An apparatus according to claim 13, wherein the channel information from the messages comprises at least one of a cell identification, a broadcast control channel, a mobile country code, a mobile network code, or a location area code.

20. An apparatus according to claim 13, wherein the network parameters comprise at least one of pseudo-noise offset, a base station identification, a system identification number, or a network identification number.

21. An apparatus according to claim 13, further comprising determining at least one of a total radio frequency spectrum for the mobile carrier or a channel allocation for each sector of a network cell of the mobile carrier.

22. An apparatus according to claim 13, wherein the network parameters comprise at least one of a pseudo-noise code for cell sector identification, a base station identification, a system identification number, or a network identification number.

23. A apparatus according to claim 13, further comprising associating the channel information with second channel information associated with previously transmitted messages that used at least one of the same network parameters.

24. A apparatus according to claim 13, wherein the mapper is to map the frequency hopping list to at least one of a data table or corresponding geographic locations at which the messages were at least one of transmitted or received from mobile devices, wherein the corresponding geographic locations are determined based on the network parameters or a global positioning system associated with the mobile carrier.

25. A tangible machine readable storage medium comprising instructions which when executed cause a machine to at least:
extract channel information from messages transmitted to mobile devices over a wireless communications radio spectrum;
identify a number of channels contained in the channel information
which have network parameters associated with a same mobile carrier; and
determine a frequency hopping list associated with the mobile carrier based on the number of channels.

26. A storage medium according to claim 25, wherein the channel information for at least one of the messages is received by at least one of the mobile devices in an idle state and comprises at least one of random access channel allocation information or broadcast control channel allocation information in neighboring cells of a global system for mobile communications network.

27. A storage medium according to claim 25, wherein the channel information for at least one of the messages is received by at least one of mobile devices in a traffic state and comprises frequency hopping channel allocation information in neighboring cells of a global system for mobile communications network.

28. A storage medium according to claim 27, wherein the network parameters comprise at least one of a cell identification, a broadcast control channel, a mobile country code, a network code, or a location area code.

29. A storage medium according to claim 27, further comprising determining at least one of a channel allocation ratio for control usage, a channel allocation ratio for traffic usage, or a channel allocation ratio for shared control and traffic usage based on the number of channels contained in the channel information.

30. A storage medium according to claim 27, wherein the channel information from the messages is received by at least one of the mobile devices in an idle state comprises at least one of a mobile carrier frequency or a channel number for use in a code division multiple access.

31. A storage medium according to claim 25, wherein the channel information from the messages is received by at least one of the mobile devices in a traffic state comprises a traffic channel number for a corresponding cell in which the message was received or a handoff frequency of a neighboring cell in a code division multiple access network.

32. A storage medium according to claim 25, wherein the network parameters comprise at least one of pseudo-noise offset, a base station identification, a system identification number, or a network identification number.

33. A storage medium according to claim 25, further comprising determining at least one of a total radio frequency spectrum for the mobile carrier or a channel allocation for each sector of a network cell of the mobile carrier.

34. A storage medium according to claim 25, wherein the network parameters comprise at least one of a pseudo-noise code for cell sector identification, a base station identification, a system identification number, or a network identification number.

35. A storage medium according to claim 25, wherein the instructions cause the machine to associate the channel information with second channel information associated with previously transmitted messages that used at least one of the same network parameters.

36. A storage medium according to claim 25, wherein the instructions cause the machine to map the frequency hopping list to at least one of a data table or corresponding geographic locations at which the messages were at least one of transmitted or received from mobile devices, the corresponding geographic locations to be determined based on the network parameter parameters associated with the mobile carrier.

* * * * *